United States Patent Office 3,018,708
Patented Jan. 30, 1962

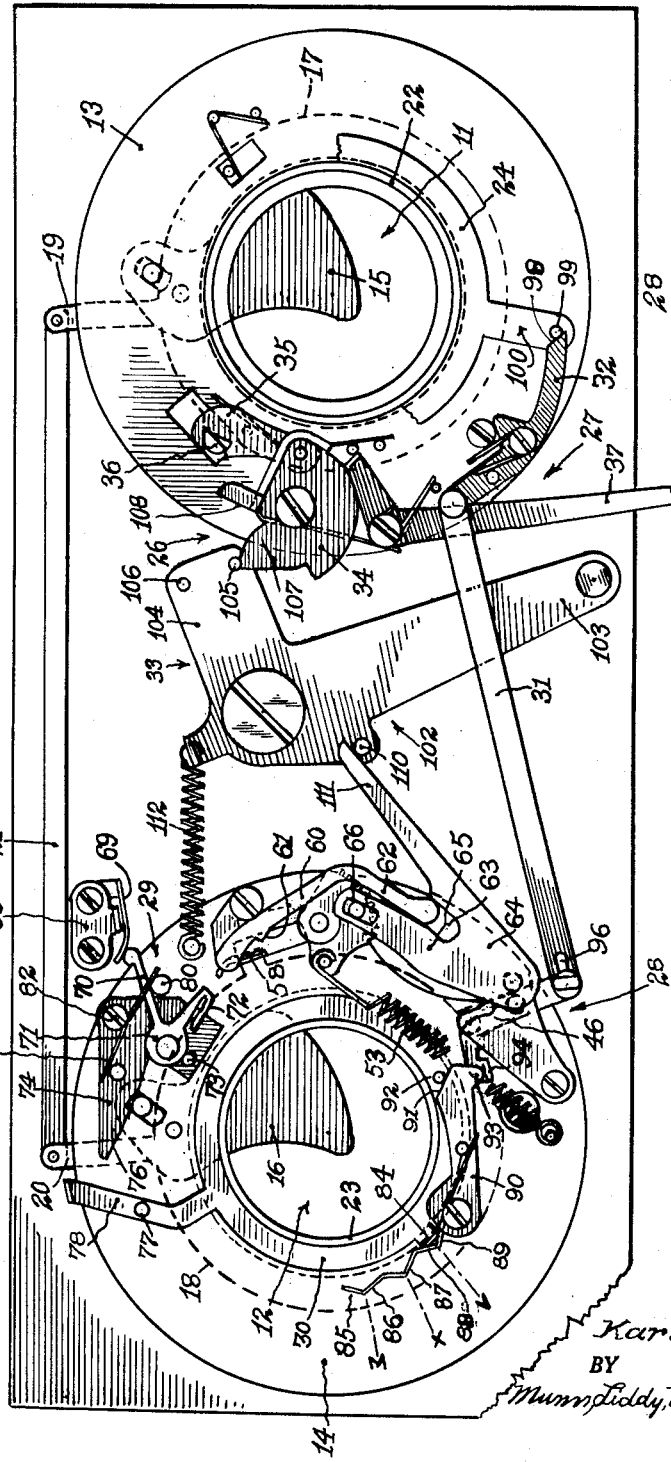

3,018,708
PHOTOGRAPHIC SHUTTER
Karl F. Rentschler, Calmbach (Enz), Germany, assignor to Alfred Gauthier G.m.b.H., Calmbach (Enz), Germany, a corporation of Germany
Filed Nov. 29, 1955, Ser. No. 549,826
Claims priority, application Germany Dec. 3, 1954
9 Claims. (Cl. 95—18)

This invention relates to photographic shutter constructions, and more particularly to shutter structures of the type used in stereo cameras, having built-in delayed action and/or synchro devices for synchronizing flash lamps of the time-lag type.

The invention is shown as embodied in photographic shutters of the intra-lens type; however, it should be understood that while the invention has particular utility in connection with intra-lens shutters it is not to be limited to the same, since, in some of its aspects, it may be employed to advantage in connection with other types of photographic shutters.

At the present time cameras are commonly being equipped with electric exposure regulators, by which automatic or semiautomatic adjustment of the shutter mechanism is provided in accordance with the light conditions of the subject to be photographed. While there is continual effort to make such electric exposure regulators small and compact, they still require an appreciable amount of space, and for greatest utility should be located in close proximity to the shutter control and actuating mechanism.

It is also, of course, essential that the camera be as small and compact as possible, and be characterized by lightness of weight together with structural strength, these characteristics being necessary because of the very nature and use of the camera. In consequence of this, and especially because of the various adjustments and functions which are desired by the operator or required to produce optimum pictures, a relatively great amount of mechanism has been incorporated in the main shutter structure adjacent the lens system. Such mechanism has tended to occupy most of the space available, and accordingly the problem of incorporating an electric exposure regulator is difficult, and requires providing the relatively voluminous space necessary while at the same time retaining the shutter adjustments and functions which have been found through past experience to be desirable and necessary.

An object of the present invention is to provide, in a stereo camera having intra-lens shutters, an improved and advantageous arrangement and organization of the shutter mechanism and improved components and interrelating mechanism, by which adequate space is provided for the incorporation of an electric exposure regulator adjacent the main shutter structure without omitting any of the desired shutter functions and adjustments heretofore found to be desirable.

A further object of the invention is to provide an improved shutter mechanism and organization as above set forth, wherein there is retained the maximum degree of sensitivity, effectiveness and reliability of operation.

Yet another object of the invention is to provide an improved shutter construction as characterized above, wherein relatively few and simple components may be utilized, thereby effecting a desirable economy in manufacture.

A feature of the invention resides in the provision of an improved shutter construction having the above advantages and which is nevertheless simple and easy to operate, and provides a safeguard against improper, inadvertent or thoughtless operation.

In the embodiment of the invention illustrated and described herein there are provided in a stereo camera the usual pair of base plates respectively adjacent the lens systems and concentric therewith, said plates being adapted to have mounted thereon the shutter blades and the shutter adjusting and actuating structures. The usual linkage means is also provided, by which concurrent or simultaneous movement of the shutter blades is effected.

By the invention, one of the base plates is provided with the shutter driving means and release system for control of said driving means, and such base plate may also be provided with the usual escapement device and shutter-speed setting ring by which there is obtainable the different shutter speeds. The other base plate, however, is now provided with the delayed-action device for self-exposures, and/or the synchro device for synchronizing flash lamps of the type having a time-lag. This delayed action and synchro device is associated with the shutter-blade actuating ring carried by the second base plate, and by the said disposition of the delayed action and synchro device on the second base plate instead of on the first where it has been heretofore located, there is made available adjacent the said first base plate a substantial amount of space, sufficient to enable an electric exposure regulator to be incorporated therein.

In conjunction with the new location of the delayed action and synchro device there are provided novel means for concurrently cocking said device and the shutter-driving mechanism, and novel linkage means by which the delayed action and synchro device is under the control of settable rings located respectively on the two base plates and having for their purpose the control of shutter speeds and flash lamps.

In connection with this latter, the invention further provides for the disposition of the electrical switch assembly adjacent the second base plate, to be actuated in response to movement of the shutter blade ring associated therewith, and provides an adjustable device on said base plate, by which control is had of said switch mechanism to include or omit a time lag.

The disposition of the components of the shutter mechanism as above set forth results in an advantageous simplification of the various adjustments required, and enables the effectiveness of the shutter mechanism to be appreciably improved.

By the present invention, both the switch mechanism and the delayed action and/or synchro device are operatively associated with the shutter blade ring carried by the second base plate, and through such organization the shutter structure is not made complicated but instead a saving is effected in the mounting of the various parts and components.

By virtue of the shutter drive mechanism being carried by one base plate and the delayed action and/or synchro device carried by the other, there is also made possible a simple and effective means by which both the said devices may be simultaneously cocked, with the minimum of additional parts or components and with a maximum of ease and facility.

Other features and advantages will hereinafter appear.

In the drawings accompanying this specification, similar characters of reference indicate corresponding parts wherever possible in the several views, in which:

FIGURE 1 is an elevational view of a shutter structure for a stereo camera made in accordance with the invention. Parts unessential to the invention have been omitted, and the shutter driving means is shown in uncocked position.

FIG. 2 is an elevational view of a well known type of delayed action device having two parts or motion-transmitting assemblages adapted to be coupled, one of said assemblages serving as a synchro device for flash synchronization, and the other assemblage providing for an appreciable time delay to enable self-exposures to be taken.

As shown, the improved shutter structure of the present invention includes an assembly plate 10 of the type adapted for use with a stereo camera. The plate 10 is provided with the usual openings for cooperation with a pair of lens systems which are disposed at locations indicated generally by the numerals 11 and 12.

Mounted on the assembly plate 10 are annular base plates 13 and 14 of the usual type, said base plates being associated with shutters in the conventional manner. In FIG. 1, only single shutter blades 15 and 16 are illustrated, it being understood that at each of the base plates 13 and 14 a plurality of such blades is provided, to form complete shutters.

The shutters which include the blades 15 and 16 are actuated by shutter blade rings 17 and 18 in the usual manner, said rings having projecting arms 19 and 20 coupled together by a link 21 whereby simultaneous turning movement of the rings and actuation of the shutter blades is effected.

The base plates 13 and 14 have nozzle portions 22 and 23 adapted to carry parts of the lens systems, and the plate 13 rotatably carries a shutter-speed setting ring 24 by which the shutter speed and/or opening may be regulated, in accordance with existing light conditions.

In the past it has been customary, in conjunction with the shutter structure including the speed setting ring 24, to mount on the base plate 13 of said ring the shutter driving means, release mechanism therefor, escapement device for the different shutter speeds, and delayed action and synchro devices, in addition to the necessary switching mechanism for the flash lamps. With this prior known arrangement, if it was desired to incorporate an electric exposure regulator for cooperation with the speed setting ring 24 there was found to be insufficient room for the same, particularly since such regulators are of somewhat voluminous dimension.

In accordance with the present invention, the problem of finding sufficient space to enable an electric exposure regulator to be incorporated in the shutter structure, is solved in a novel and effective manner by providing on the base plate 13 only the shutter driving mechanism and release therefor, together with the escapement device for different shutter speeds, and by providing on the base plate 14 the delayed action and synchro device, together with the switch mechanism for the flash lamps, in conjunction with novel cooperable components and linkages by which all of the desired, heretofore provided functions and adjustments are retained while effecting a desirable simplicity, effectiveness and ease of operation. I have found that with such an organization, the mounting of the components and the number and arrangement of the same are advantageously simplified, and reliability of performance is had with economy of manufacture. Moreover, there is avoided undesirable cramping of many parts in restricted spaces, thereby simplifying the assemblage of the shutter structure and maintaining fabricating costs in general at a lower value.

Accordingly, as shown in FIG. 1, there is provided on the base plate 13 only a shutter driving means indicated generally by the numeral 26, a release means 27, the speed setting ring 24, and the usual escapement device for obtaining different shutter speeds (not shown), while on the base plate 14 there is mounted the delayed action and synchro device indicated generally by the numeral 28, the switch actuating mechanism indicated by the numeral 29, and a setting ring 30 arranged to adjust said switch actuating mechanism and also couple and uncouple the delayed action device.

In conjunction with the above, there is also provided a coupling means for the delayed-action device comprising a link 31 and a lever 32, the latter being on the base plate 13 to enable coupling and uncoupling to be effected by the shutter-speed setting ring 24 as well as by the setting ring 30, and a manually operable means indicated generally by the number 33 to enable simultaneous cocking of the shutter driving means and delayed action device to be quickly and conveniently effected. This novel shutter structure and organization provides the various advantages which have been enumerated above, and will now be described in detail.

On the plate 13 there is rotatably mounted a master drive member 34 coupled to a latch arm 35 having a notched end engaging a drive pin 36 carried by the shutter blade ring 17. The master drive member 34 is spring urged clockwise and is shown in FIG. 1 at the completion of clockwise movement, wherein it has actuated the shutter blade through an opening and closing operation. The drive member 34 is held in a locked position (rotated counterclockwise approximately 120 degrees from the position of FIG. 1) by a spring-charged release lever 37 carried on the base plate 13, and it will be understood that the above driving and release means is of the conventional type commonly employed at the present time, insofar as their function of actuating the shutters is concerned.

On the base plate 14 I provide, at the right portion thereof as viewed in FIG. 1, a usual type of delayed action and/or synchro device which is illustrated by itself in FIG. 2. This device comprises a bearing plate 40 on which there is rotatably mounted a toothed sector 41 engaging a pinion 42 carried by a gear wheel 43 which in turn engages a second pinion 44 mounted on a second gear wheel 45.

Pivotally mounted on the bearing plate 40 is a coupling lever 46 carrying on one arm a gear wheel 47 and a pinion 48 attached to the gear wheel, said pinion being engageable with the gear wheel 45 and being separable therefrom upon counterclockwise movement of the coupling lever 46. Meshing with the gear wheel 47 is a pinion 50 rotatable with an anchor wheel 51, the latter being cooperable with a reciprocable anchor 52 in the usual manner. As seen in FIG. 1, the toothed segment 41 is normally spring urged by a helical extension spring 53 in a clockwise direction, and arrest of the delayed action device is effected by a pin 54 on the gear wheel 43 engageable with the hooked end 55 of a locking lever 56 pivoted on the bearing plate 40.

It will be understood that the delayed action device shown in FIG. 2 is thus constituted of two motion-transmitting assemblages which may be coupled or uncoupled by actuation of the coupling lever 46. With the parts in the positions shown in FIG. 2 an appreciable delay is had by virtue of the slowing action of the anchor 52, and this adjustment is utilized for the purpose of enabling self-exposures to be taken. When, as viewed in FIG. 2, the coupling lever 46 is swung counterclockwise it will disengage the pinion 48 from the gear 45, whereupon the restraint of the anchor 52 is removed and the run down of the device is made much more rapid, thereby adapting it for use in connection with the synchronization of flash lamps.

As seen in FIG. 1, the shutter blade ring 18 has an upstanding lug or arm 58 which is engageable with a second arm 59 of the lever 56, thereby to swing said lever counterclockwise and release the delayed action device for running down. Such action will occur upon the shutters being subjected to the action of the master drive member 34 at the initiation of movement of the shutter blade rings 17 and 18. Such movement of the shutter blade rings is, however, virtually immediately halted by a one-armed lever 60 pivoted on the base plate 14 and having a nose portion 61 engageable with the arm 58. The lever 60 is of angular configuration, having an angularly extending lower portion 62 which is received in a slot 63 of a two-armed angular lever 64 also pivoted on the base plate 14. One arm 65 of the lever 64 is slotted and receives a pin 66 on the toothed segment 41 whereby the lever 64 is driven clockwise by the segment and in turn drives the angular lever 60 counterclockwise to thereby effect release of the shutter blade ring 18 after an interval of operation of the delayed action device. Such release of the shutter blade ring 18 will, of course, enable the master drive member 34 to operate the shutters through an opening and closing cycle.

If the coupling lever 46 is in the position shown in FIG. 2 then an appreciable time will be required for the delayed action device to run down. During this time the opening and closing of the shutter will be delayed by the locking lever 60, enabling the photographer to take a self-exposure. If, on the other hand, the coupling lever 46 has been swung counterclockwise to disengage the pinion 48 from the gear 45 the running down period will be very brief, and this will be utilized for synchronization of the flash lamp.

In conjunction with this latter, the switch mechanism 29 is employed. This mechanism comprises a pair of switch contacts 68 and 69 carried by the assembly plate 10 adjacent the base plate 14, the latter contact being resilient and being actuatable by one arm 70 of a two-armed lever 71 which has a second arm 72 engageable by a pin 73 carried by the shutter blade ring 18. The lever 71 is pivoted on a swingable bearing plate 74 pivotally carried by the base plate 14, said bearing plate being normally spring urged in a counterclockwise direction by a spring 75 and having a camming edge 76 which is engageable by and cooperable with a pin 77 on a manually operable fingerpiece or arm 78 carried by the setting ring 30.

With the parts in the position shown in FIG. 1 the bearing plate 74 is held in a counterclockwise position against a post 80, thereby positioning the lever 71 and particularly the arm 72 thereof for retarded engagement by the pin 73. Upon the setting ring 30 being turned clockwise to cause the pin 77 to cam upward and clockwise the bearing plate 74, the arm 72 of the lever 71 will be positioned more to the left, thereby to effect an earlier engagement thereof by the pin 73 during the clockwise driving movement of the shutter blade ring 18. It will be noted that the pivot point for the bearing plate 74 is the screw 82 carried by the base plate 14.

For the purpose of yieldably holding the setting ring 30 in different operative positions it is provided with an upstanding lug 84 engageable with a leaf spring 85 having nesting portions 86, 87 and 88 marked respectively M, X and V and adapted to receive and nest the lug 84. For the position M of the setting ring 30 the pin 77 thereof will cam clockwise the bearing plate 74 and dispose the lever arm 72 closer to the driving pin 73, thereby to effect an earlier closing of the switch contacts 68 and 69. Such earlier closing is utilized in conjunction with flash lamps having a time lag and will compensate for the same, whereby the opening of the shutter will not occur before the lamp is made to flash. For the position X of the ring 30 the bearing plate 74 will not be cammed clockwise, and closing of the switch contact 68, 69 will occur slightly later and more nearly simultaneously with full opening of the shutter. Accordingly for this position the camera is set for flash without time lag, whereby it may be used in conjunction with electronically controlled flash means.

By the present invention the setting ring 30 is also made to effect uncoupling of the delayed action device 28, for the positions X and M. To accomplish this, there is provided a lever 90 pivoted on the base plate 14 and normally spring urged counterclockwise, said lever having a camming edge 91 engageable by a pin 92 carried by the setting ring 30. The lever 90 has a nose portion 93 engageable with a lug 94 on the coupling lever 46, and for the positions X and M of the setting ring 30 the lever 90 will be cammed downward or clockwise, driving the coupling lever 46 counterclockwise and uncoupling the two parts of the delayed action device. Thus, for these settings, the camera will be adjusted for flash synchronization either without lag or with lag.

By the present invention I also provide a simple and novel means for effecting such uncoupling of the delayed action device by a setting of the shutter speed setting ring 24 carried by the base plate 13.

As shown in FIG. 1 the link 31 has at its left extremity a slot 96 by which it is pin-connected to the coupling lever 46, such connection being characterized by lost motion. The link 31 is connected to one arm of the lever 32 carried by the base plate 13, and said lever has a camming edge 98 engageable by a pin 99 on a portion 100 of the speed setting ring 24 carried by the base plate 13. When the speed setting ring 24 is, for example, in the position known as "B," corresponding to a time exposure, the lever 32 will be cammed clockwise by the pin 99, thereby swinging the coupling lever 46 counterclockwise and uncoupling the delayed action device so that it will not be effective for self-exposures. For this setting of the shutter speed setting ring 24, the uncoupling of the delayed action device will take precedence over any setting of the setting ring 30. However, for other settings of the ring 24, due to the lost motion driving connection of the link 31, the setting of the ring 30 will be effective in controlling the delayed action device.

Further, in accordance with the present invention, I provide a novel and improved means by which there may be effected a simultaneous cocking of both the shutter driving means and the delayed action device. Referring again to FIG. 1, there is provided on the assembly plate 10 a manually operable lever 102 having a finger engageable arm 103, said lever having an actuating arm 104 provided with pins 105 and 106. Cooperable respectively with the pins 105 and 106 are tooth-like projecting portions 107 and 108 on the master drive member 34. The engagement of the pins 105 and 106 with the portions 107 and 108 is in the manner of gear teeth, and when the lever 102 is swung clockwise as viewed in FIG. 1 it will rotate the master drive member 34 counterclockwise to the point where it is latched in cocked position by the releasing lever 37.

The lever 102 also has a pin 110 engageable with an arm 111 of the two-armed angular lever 64, and clockwise turning of the lever 102 will effect a counterclockwise turning of the lever 64, thereby to swing the toothed segment 41 clockwise and cock the delayed action device. As mentioned above, the hooked lever 56 then becomes effective to maintain the delayed action device cocked until it is released by the action of the lug 58 on the shutter blade ring 18. The lever 102 is normally held in a counterclockwise position by a helical extension spring 112, as shown.

By the above organization I have provided a novel and advantageous shutter structure for a stereo camera, by which the delayed action device and switch mechanism has been shifted from its conventional position on one shutter base plate to a new position on the second shutter base plate without altering in the least the effectiveness and reliability of its operation, or requiring additional complicated components and mounting means therefor. All of the desired functions have been retained, together with the high efficiency of operation and simplicity of structure and assembly, while at the same time there is provided adequate room at the first base plate for the incorporation of an electric exposure regulator. Coupling and uncoupling of the delayed action device is controlled at both shutters in accordance with the settings of the speed setting rings, and an advantageous correlation is had by the arrangement provided. Moreover, I obtain a simultaneous cocking of the shutter drive means and delayed action device, in a novel and simple manner.

Variations and modifications may be made within the scope of the claims, and portions of the improvements may be used without others.

I claim:

1. In a photographic shutter construction for a stereo camera, an assembly plate and a pair of bases carried by said plate and adapted to be disposed adjacent the two spaced separate lens systems respectively of the camera; a pair of separate, spaced movable shutters mounted respectively on said bases, associated respectively with said lens systems for admitting or shutting out the light of said lens systems; positive reversibly operative shutter link means coupling said shutters for simultaneous movement, said link means having a positive driving action on each shutter in both of opposite directions; spring-powered shutter-drive means carried by one base and connected to the associated shutter for driving the same, said other shutter being driven through said coupling means by said spring-powered means and said spring-powered means being remote from the other of said bases and not dependent on said other base for its support; an exposure-time escapement device carried by said one base, for effecting different shutter speeds of both said shutters in part through the medium of the said positive link means; a release mechanism on said one base, controlling said spring-powered driving means; and means comprising a delayed action device carried by the other base and connected solely to the shutter mounted on said other base, for controlling the movement of the said shutter and its coupled shutter upon release of the said shutter driving means.

2. The invention as defined in claim 1, in which the means including the delayed action device controlling the shutter movement comprises a pair of cooperable movement-transmitting assemblages on the other base, and comprises means carried by the other base for coupling said assemblages to each other for simultaneous movement and for uncoupling the said assemblages for independent movement of one of the same.

3. The invention as defined in claim 2, in which there is a member movably mounted on said one base, and in which there is a linkage means connected between said member and the said coupling and uncoupling means carried by the other base.

4. The invention as defined in claim 3, in which the member movable on the said one base comprises a control lever, and in which the linkage means comprises a rod connected to said lever and having a lost-motion driving connection with the said coupling and uncoupling means.

5. The invention as defined in claim 4, in which there is a shutter speed setting ring movably carried by the said one base and connected to the exposure time escapement device on the said one base, and in which there are means on the said one base for actuating the said control lever in response to movement of said speed setting ring.

6. The invention as defined in claim 1, in which the spring-powered shutter driving means includes a first spring on the one base, in which the means controlling the shutter movement includes a second spring on the other base, and in which there is an actuator means coupling said shutter driving and movement controlling means for concurrent movement against the action of the said springs, to cock the same.

7. The invention as defined in claim 6, in which there is a manually operable lever connected to said actuator means to actuate the same and enable the shutter driving and movement controlling means to be simultaneously cocked.

8. The invention as defined in claim 7, in which the shutter driving means includes a rotary master member on the one base, having a pair of teeth, and in which the actuator means includes a lever having teeth adapted to engage the teeth of said master member.

9. The invention as defined in claim 1, in which there is a shutter blade ring on said other base, operatively connected to the said associated shutter, said ring being engageable with the means controlling the shutter movement and being temporarily halted thereby.

References Cited in the file of this patent

UNITED STATES PATENTS

| | | |
|---|---|---|
| 2,326,077 | Steiner | Aug. 3, 1943 |
| 2,365,847 | Steiner | Dec. 26, 1944 |
| 2,654,299 | Smith | Oct. 6, 1953 |
| 2,671,390 | Smith | Mar. 9, 1954 |
| 2,859,674 | Rentschler | Nov. 11, 1958 |

FOREIGN PATENTS

| | | |
|---|---|---|
| 430,294 | Germany | Jan. 14, 1926 |
| 694,166 | Germany | July 26, 1940 |